United States Patent

[11] 3,632,417

[72] Inventor Wallace R. Brasen
Madison, Tenn.
[21] Appl. No. 812,157
[22] Filed Apr. 1, 1969
[45] Patented Jan. 4, 1972
[73] Assignee E. I. du Pont de Nemours and Company
Wilmington, Del.

[54] MICROPOROUS SYNTHETIC SHEET MATERIAL HAVING A FINISH OF A POLYESTER POLYURETHANE AND CELLULOSE ACETATE BUTYRATE
7 Claims, 1 Drawing Fig.

[52] U.S. Cl. .................................................... 117/135.5,
117/138.8, 161/159, 117/76
[51] Int. Cl. ........................................................ C09d 5/00,
C09d 3/66, D01n 3/00
[50] Field of Search ............................................ 117/63, 76,
135.5; 260/13, 16; 161/159, 160, 161

[56] References Cited
UNITED STATES PATENTS

| | | | |
|---|---|---|---|
| 2,970,970 | 2/1961 | Prichard | 260/16 |
| 3,000,757 | 9/1961 | Johnston et al. | 117/63 |
| 3,100,721 | 8/1963 | Holden | 117/135.5 |
| 3,115,479 | 12/1963 | Windemuth et al. | 260/47 |
| 3,190,766 | 6/1965 | Yuan | 117/63 |
| 3,208,875 | 9/1965 | Holden | 117/135.5 |
| 3,360,422 | 12/1967 | Desch | 161/160 |
| 3,366,586 | 1/1968 | Crowley et al. | 260/17 |

Primary Examiner—Morris Sussman
Attorney—Hilmar L. Fricke

ABSTRACT: A vapor permeable coriaceous synthetic microporous sheet material having a high-quality finish coat of polyurethane and cellulose acetate butyrate is the subject of this invention; the finish in adherence with the microporous coating of the sheet material is a polymer blend of a chain-extended polyester polyurethane and cellulose acetate butyrate having a butyryl content of 10–60 percent by weight viscosity of about 1–20 poises.

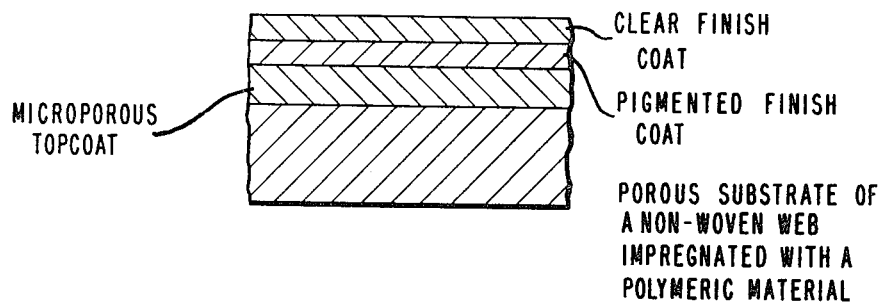
INVENTOR
WALLACE R. BRASEN
BY *Hilmar L. Dinke*
ATTORNEY

MICROPOROUS SYNTHETIC SHEET MATERIAL HAVING A FINISH OF A POLYESTER POLYURETHANE AND CELLULOSE ACETATE BUTYRATE

BACKGROUND OF THE INVENTION

This invention concerns synthetic microporous coriaceous sheet material that is particularly useful for making shoe uppers, ladies handbags, purses, belts, and the like. In particular, this invention relates to a synthetic microporous coriaceous sheet material that has a high-quality finish and has excellent water vapor permeability, superior flexibility, scuff and crack resistance.

Synthetic microporous coriaceous sheet materials can be made according to the process as disclosed in the following patents: Johnston et al. 3,000,757, issued Sept. 19, 1961; Holden 3,100,721, issued Aug. 13, 1963; Yuan 3,190,766, issued June 22, 1965; Holden, 3,208,875, issued Sept. 28, 1965; Patsis 3,364,098, issued Jan. 16, 1968 and Manwaring 3,391,049, issued July 2, 1968.

The microporous sheet materials made according to the methods set forth in the aforementioned patents are of excellent quality, but require a high-quality finish which does not require buffing or polishing even after long periods of use. The currently available finishes are either too costly or after even short periods of use microcrack, check, and flake or are easily scuffed.

The novel coriaceous synthetic microporous sheet material of this invention has a finish which is economical and is resistant to these aforementioned problems of microcracking, checking, and flaking and has excellent abrasion and scuff resistance even after long periods of use and also has a high water vapor permeability.

SUMMARY OF THE INVENTION

The novel vapor-permeable coriaceous synthetic microporous sheet material of this invention comprises:

1. a porous substrate of a synthetic polymeric material reinforced with fibers having adhered thereto a microporous synthetic polymer coating A, and
2. about 0.02–5 mils of nonporous vapor-permeable finish B in adherence with said microporous coating A, and consists essentially of a blend of
   a. about 20–80 percent by weight of a chain-extended polyester polyurethane of an isocyanate terminated prepolymer of a diisocyanate selected from the group consisting of an aliphatic diisocyanate and cycloaliphatic diisocyanate, and a hydroxy-terminated polyester glycol having a molecular weight of 500–3,500, and is chain-extended with a diamine selected from the group consisting of an aliphatic diamine and a cycloaliphatic diamine, and
   b. about 80–20 percent by weight of cellulose acetate butyrate having a butyryl content of 10–60 percent by weight and a viscosity of about 1–20 poises as measured according to ASTM–D–1343–54–T.

DESCRIPTION OF THE INVENTION

Preferably, the novel microporous sheet material of this invention has a finish of a blend of 1. about 35–65 percent by weight of a chain-extended polyester polyurethane of an isocyanate-terminated prepolymer which is formed from an aliphatic diisocyanate or a cycloaliphatic diisocyanate and a hydroxyl-terminated polyester glycol that has a molecular weight of about 800–1,800 and is chain-extended with an aliphatic diamine; and
2. about 65–35 percent by weight of cellulose acetate butyrate that has a butyryl content of about 15–50 percent by weight and a viscosity of about 1–15 poises.

The chain-extended polyester polyurethane used to form the finish of the novel sheet material of this invention is of an isocyanate terminated prepolymer of an aliphatic diisocyanate or a cycloaliphatic diisocyanate and a hydroxy-terminated polyester which is chain-extended with an aliphatic or a cycloaliphatic diamine.

Typical aliphatic and cycloaliphatic diisocyanates which are used to form the polyurethane for the finish used on the novel sheet material of this invention are:
  ethylene diisocyanate,
  propylene-1,2-diisocyanate,
  tetramethylene diisocyanate,
  hexamethylene diisocyanate,
  decamethylene diisocyanate,
  cyclohexylene-1,2-diisocyanate,
  methylene-bis-(4-cyclohexylisocyanate),
  ethylene-bis-(4-cyclohexylisocyanate),
  propylene-bis-(4-cyclohexylisocyanate), and the like.

Particularly preferred diisocyanates, since they form a high-quality finish and a polyurethane that is compatible with cellulose acetate butyrate, are hexamethylene diisocyanate and methylene-bis-(4-cyclohexylisocyanate).

The polyester glycol used to form the polyurethane for the finish used on the novel sheet material of this invention is prepared by reacting a dicarboxylic acid or a mixture of dicarboxylic acids with a sufficient amount of a low molecular weight glycol to give a hydroxy terminated polyester. The polyester has a molecular weight of about 500–3,500. Typical aliphatic dicarboxylic acids and aromatic dicarboxylic acids that can be used are malonic acid, succinic acid, glutaric acid, adipic acid, pimelic acid, suberic acid, azelaic acid, sebacic acid and the like; phthalic acid, isophthalic acid, terephthalic acid, uvitic acid, cumindinic acid and the like. Preferred are adipic acid and phthalic, isophthalic and terephthalic acids since these acids form a high-quality finish. Typical glycols which can be used to form the above polyesters are ethyleneglycol, propylene glycol, butanediol, pentamethylenediol and the like.

Typical aliphatic and cycloaliphatic diamines that are used as chain extenders for the polyurethanes used in the novel finish of this invention are:
  hydrazine,
  mono-substituted hydrazines,
  ethylene diamine,
  1,4-cyclohexane-bis-(methylamine),
  1,4-cyclohexane-bis-(ethylamine),
  1,4-cyclohexane-bis-(propylamine),
  piperazine,
  and the like. Preferred chain extenders are ethylene diamine and 1,4-cyclohexane-bis-(methylamine) since these chain extenders form a high-quality finish.

The aforementioned polyester polyurethane is prepared by conventional polymerization techniques. The hydroxy-terminated polyester is prepared by reacting a slight excess of the glycol with the dicarboxylic acid for about 30 minutes to 4 hours at about 80°–200° C. The diisocyanate is added to the polyester and reacted at about 80°–200° C. for about 30 minutes to 4 hours to form an isocyanate-terminated prepolymer. The chain extender is then added and reacted at about 25°–75° C. for about 30 minutes to 3 hours.

The aforementioned polyester and the polyester polyurethane are prepared by using conventional solvents such as toluene, acetone, diacetone alcohol, xylene, isopropanol, and the like. These solvents can also be added to dilute the finish composition.

The cellulose acetate butyrate is blended with the chain-extended polyester polyurethane to form the novel finish composition of this invention.

The cellulose acetate butyrate used to prepare the finish composition of this invention is of the conventionally available type and has a viscosity of about 1–20 poises, and preferably, 1–15 poises and a butyryl content of 10–60 percent by weight, and preferably, 15–50 percent by weight.

The finish composition of this invention contains about 5–50 percent by weight of the polymer blend of cellulose acetate butyrate and a chain-extended polyurethane and one or more of the aforementioned solvents for the polymer blend.

Any of the well-known pigments, extender pigments, and dyes can be added to the novel finish composition used to form the novel microporous sheet material of this invention to give the desired color to the product. About 0.1–50 percent by volume pigment and preferably, 15–25 percent by volume pigment, can be used. Typically useful pigments are, for example, metal oxides, such as titanium dioxide, metal hydroxides, chromates, silicates, sulfides, sulfates, carbonates, carbon blacks, organic dyes, such as β-copper phthalocyanine, lakes and metal flake pigments.

The amount of finish required to form the novel coriaceous microporous sheet material of this invention is about 0.1–5.0 oz./square yard and more preferably, 0.2–1.5 oz./square yard (dry weight basis). The thickness of the finish after it is dried and in firm adherence to the synthetic microporous sheet, is about 0.1–5 mils, preferably 0.1–2 mils, but more preferably, the finish is about 0.2–1.5 mils thick. When the microporous material is to be used as a leather replacement in shoes, it is often preferable to have a finish of two separate layers; the first layer of finish composition contains a large amount of pigment, such as titanium dioxide, for hiding defects on the surface of the synthetic microporous foundation material and the second layer of finish contains the desired pigments to provide the necessary color for the material, or this second finish coat may be clear if the first coat gives the substrate the desired color. This second finish coat may be clear or pigmented depending on the aesthetics required for the novel sheet material.

One preferred embodiment of the vapor-permeable coriaceous synthetic microporous sheet material of this invention can readily be understood by reference to the FIGURE which illustrates a cross section of the sheet material of this invention. In the FIGURE, a porous substrate of a nonwoven web that is impregnated with a synthetic polymeric material and has a microporous chain-extended polyurethane topcoat about 10–30 mils thick has a pigmented finish coat of a thickness of about 0.1–4 mils, which hides the surface defects of the synthetic microporous material. A clear finish coat of the novel finish composition of this invention is in firm adherence with the pigmented primer finish and is about 0.02–1 mil thick.

The finish composition can be applied to the synthetic microporous material by a variety of methods. For example, the finish can be formed into a film and laminated to the surface of the microporous material. Preferably, the finish is applied from a solution by any of the well-known methods, for example, spraying, roller coating, dipping, swabbing, brushing, padding or printing; spraying and dip coating are preferred methods for applying the finish to form the novel sheet material of this invention.

The synthetic microporous sheet material to which the finish composition is applied can be prepared according to the process disclosed in the aforementioned patents, Johnston et al. 3,000,757; Holden 3,100,721; Yuan 3,190,766; Patsis 3,364,098 and Manwaring 3,391,049, which are hereby incorporated by reference.

One particularly preferred microporous sheet material to which the novel finish of this invention is applied to form a high-quality product has a porous substrate of nonwoven web of polyester fibers, preferably polyethylene terephthalate fibers that are impregnated with a blend of a chain-extended polyurethane and up to 50 percent by weight of polyvinyl chloride. This porous substrate has a microporous polymer coating which is a blend of a chain-extended polyurethane and up to 50 percent by weight of polyvinyl chloride. The chain-extended polyurethane in the substrate and the microporous coating preferably is of a polyalkyleneether glycol and an aromatic diisocyanate and is chain-extended with a diamine such as hydrazine. Optionally, an interlayer fabric can be placed between the porous substrate and the microporous coating as taught in the aforementioned Patsis and Manwaring patents. One particularly preferred interlayer fabric is cotton and polyethylene terephthalate fibers.

The novel finish composition of this invention can also be used on leather, vinyl-coated fabrics or other flexible substrates on which a flexible, durable, tough finish is required.

The examples which follow illustrate the invention. All quantities are on a weight basis unless otherwise indicated.

EXAMPLE 1

|  | Parts By Weight |
|---|---|
| "Rucoflex" S: 103–110 (a hydroxyl-terminated polyester which is believed to be the esterification product of ethylene glycol/propylene glycol/adipic acid | 800 |
| "Hylene" W: [methylene-bis-(4 -cyclo-hexyl isocyanate)] | 353 |
| Toluene | 382 |
| Total | 1,535 |

The above ingredients are charged into a reaction vessel equipped with a reflux condenser and a stirrer and reacted at about 120° C. for about 1 hour. The reaction mixture is cooled to room temperature and diluted with about 465 parts by weight of toluene to give a solution of about 57 percent polymer solids. About 1,000 parts by weight of the above prepolymer solution are blended with 785 parts by weight toluene and 812 parts by weight of tertiary butyl alcohol. A chain-extender solution of 5 percent ethylene diamine and a 60/40 toluene/butanol solvent is slowly added to the dilute prepolymer solution with constant agitation until a viscosity of 55 poises at 35° C. is reached. This requires about 310 parts by weight of the chain-extender solution. About 28 parts by weight of a chain stopper solution (5 percent diethyl amine solution in toluene) is then blended with the polymer solution. The resulting chain-extended polyurethane polymer solution has a 20 percent polymer solids content.

A finish composition is prepared by blending the following ingredients:

|  | Parts By Weight |
|---|---|
| Cellulose acetate butyrate solution 20% solids in a 50/50 diacetone alcohol/toluene solvent in which the polymer has a 38% butyryl content and a viscosity of 1.12–1.88 poises determined according to ASTM-D-1343-54-T) | 60 |
| Chain-extended polyurethane solution prepared above (20% polymer solids) | 40 |
| Total | 100 |

A 1-mil thick film of the above finish composition is knife-coated to a glass plate and allowed to air-dry. The resulting coating has a good clarity, excellent appearance and is flexible.

A roll of microporous polyurethane sheet about 42 inches wide is made in accordance with the teachings in example 1 of U.S. Pat. application Ser. No. 355,436, now abandoned, to Bateman, filed Mar. 27, 1964. The resulting product is a porous impregnated nonwoven web about 50 mils thick of 2 denier heat-shrunk polyethylene terephthalate fibers impregnated with a microporous polyurethane polymer having an interlayer fabric and that is uniformly coated on one side with about 10 mils of a microporous polyurethane polymer. A thin polyurethane primer pigmented with carbon black is applied over the microporous coating.

The above-prepared finish composition is diluted to a spray viscosity with a 60/40 isopropanol/toluene solvent and is sprayed onto the above microporous sheet material that has been coated with a polyurethane finish pigmented with carbon black. The finish is air-dried and the resulting sheet has a clear finish about 0.1 mil in thickness. The product has an excellent appearance.

This finished microporous polyurethane sheet material is subjected to the following tests and the results of the tests are recorded in table I.

Bally Flexometer Test

The Bally Flexometer provides a rolling, folding type of action while the sample is rocked up and down. The samples are inspected after 20,000 flexes. Appearance of cracks in the finish and also failure of actual finish by flaking, is recorded.

Water Vapor Permeability Determinations

Permeability of the above-prepared finished microporous polyurethane sheet material is determined by sealing the sheet on the top of a cup containing $CaCl_2$ and by determining the weight increase of $CaCl_2$ due to moisture pickup in the cup. The cup is stored at 50 percent R.H. in a constant temperature room at 72° F. for a 2-hour period. The water vapor permeability of the sheet is then calculated in grams of water per 1 square meter of material per 24 hours.

Cold Cracking Test

The above-prepared finished sheet material is subjected to −30° C. temperature and while the sheet is at this temperature, the sheet is folded 180° with the finished surface being the outer side of the sheet after it is folded. The sheet is then returned to a straight or flat position and the finish is examined for microcracks and breaks. This test applies a severe tensile stress to the finish while it is at a low temperature.

Edgewear Test (Dry Abrasion)

This test abrades the surface of the finished microporous polyurethane sheet material. A sample is fastened onto a half-round cylinder having a diameter of about 2 inches and weighing approximately 4 pounds. The cylinder is pushed back and forth across a Wellington-Sears No. 10 duck cloth. Under these conditions, the sample is subjected to about a 2-pound load per linear inch. After 1,500 strokes, the samples are examined for abrasion of the surface of the finish.

In general, the aforementioned tests illustrate that the above-prepared finished microporous polyurethane sheet material has excellent flex, crack and abrasion resistance even under severe test conditions, such as, a low temperature of −30° C. which is required of a material used for shoe uppers.

A second finish composition is formulated with the above-prepared chain-extended polymer solution as follows:

| | Parts By Weight |
|---|---|
| Cellulose acetate butyrate solution 6.6% solids in a solvent blend of toluene/methyl cellosolve acetate/diacetone alcohol/isopropanol/acetone, weight ratio 22/10/14/13/11 and in which the cellulose acetate butyrate has a 17% butyryl content and a viscosity of 5.6–9.4) | 75 |
| Chain-extended polyurethane polymer solution prepared above (20% polymer solids) | 25 |
| Total | 100 |

The above-prepared finish is coated onto a glass plate and onto a microporous sheet material prepared above and primed with a pigmented polyurethane finish. The resulting finish has properties similar to the above finish, such as excellent appearance, good clarity, abrasion and cold crack resistance, excellent flexibility and a high water vapor permeability.

EXAMPLE 2

A prepolymer solution prepared as in example 1 is diluted with isopropanol and toluene and is chain-extended with a 9 percent solution of 1,4-cyclohexane-bis-(methylamine) until a viscosity of 56 poises at 34° C. is reached. A chain-stopper solution as described in example 1 is then added in the same ratio as example 1. The resulting chain-extended polyurethane solution has a 20 percent polymer solids content.

A finish composition is prepared by blending the following ingredients:

| | Parts By Weight |
|---|---|
| Cellulose acetate butyrate solution (20% solids solution in a 67/33 diacetone alcohol/toluene solvent in which the cellulose acetate butyrate has a viscosity of 9–13.5 poises determined according to ASTM-D-1343-54-T and has a 27% butyryl content) | 25 |
| Chain-extended polyurethane solution (prepared as above) | 75 |
| Total | 100 |

The resulting finish is cast onto a glass plate and sprayed onto the microporous sheet material of example 1 and subjected to the same tests as described in example 1. The results of these tests are recorded in table I. The finish has an excellent appearance, good clarity, high gloss and has excellent flex, crack, and abrasion resistance.

EXAMPLE 3

| | Parts By Weight |
|---|---|
| Polyester glycol (hydroxyl-terminated polyester of ethylene glycol and adipic acid having a molecular weight of 1,000 | 800 |
| "Hylene" W methylene-bis-(4-cyclohexyl isocyanate) | 356 |
| Toluene | 385 |
| Total | 1,541 |

The above ingredients are charged into a reaction vessel equipped with a reflux condenser and heated to about 120° C. for 1 hour. The reaction mixture is cooled to room temperature and diluted with toluene to a 57.8 percent polymer solids content.

The polymer is chain extended according to the following procedure: 465 parts by weight isopropanol and 125 parts by weight toluene are blended with 1,000 parts by weight of the above-prepared polymer solution. An ethylene diamine solution (5 percent solution in a 60/40 toluene/isopropanol solvent mixture) is slowly added with constant agitation to the above-diluted polymer solution until the viscosity of the solution reaches 48.5 poises at 31° C. About 240–300 parts by weight of ethylene diamine are required. About 28 parts by weight of a chain-stopper solution (5 percent solution of diethylamine in toluene) is then added to the polymer solution with constant agitation. The resulting chain-extended polyurethane solution has a polymer solids content of about 30 percent.

A finish composition was prepared by blending the following ingredients:

| | Parts By Weight |
|---|---|
| Cellulose acetate butyrate solution (20% solids, described in example 2) | 20 |
| Chain-extended polymer solution (30% polymer solids) | 20 |
| Total | 40 |

The resulting finish is cast onto a glass plate and sprayed onto the microporous sheet material of example 1 and if subjected to the same tests as described in example 1, the results of these tests are expected to be similar to those that are recorded in table I. The finish has an excellent appearance, good clarity, high gloss and has excellent flex, crack, and abrasion resistance.

EXAMPLE 4

| | Parts By Weight |
|---|---|
| Polyester glycol (hydroxy-terminated polyester of ethylene glycol/neopentyl glycol/adipic acid/isophthalic acid molar ratio of 5/1/4.5/0.5 | 805 |
| "Hylene" W -[methylene-bis-(4-cyclohexyl isocyanate)] | 366 |
| Toluene | 390 |
| Total | 1,561 |

The above ingredients are charged into a reaction vessel equipped with a stirrer and a reflux condenser and heated to about 120° C. for about 1 hour. The reaction is cooled to room temperature and 439 parts by weight of toluene are blended with the polymer solution to give a solution having a 58 percent polymer solids content.

The polymer is chain extended by slowly adding an ethylene diamine solution (5 percent solution—60/40 toluene/isopropanol solvent blend) to about 1,000 parts by weight of the above-prepared polymer solution diluted with 419 parts isopropanol and 192 parts toluene until a viscosity of 40 poises at 35.5° C. is reached. This requires about 300 parts by weight of the chain-extender solution. About 28 parts by weight of chain-stopper solution (5 percent diethylamine in toluene) is blended with the chain-extended polymer solution. The resulting chain-extended polymer solution has a polymer solids content of about 30 percent.

A finish is formulated by blending the following ingredients:

| | Parts By Weight |
|---|---|
| Cellulose acetate butyrate (20% solids—described in example 2) | 20 |
| Chain-extended polymer solution prepared as above (30% polymer solids) | 20 |
| Total | 40 |

The resulting finish is cast onto a glass plate and sprayed onto the microporous sheet material of example 1 and if subjected to the same tests as described in example 1, the results of these tests are expected to be similar to these that are recorded in table I. The finish has an excellent appearance, good clarity, high gloss and has excellent flex, crack, and abrasion resistance.

TABLE I.—EVALUATION OF FINISHED MICROPOROUS SHEET MATERIALS PREPARED IN EXAMPLES 1-2

| Microporous polyurethane sheet material of— | Bally flex (20,000 flexes) | Cold cracking, −30° C. | Water vapor permeability, gm./m.²/24 hours | Edgewear (dry) |
|---|---|---|---|---|
| Example 1 | 1 | 1 | 3,500 | 1 |
| Example 2 | 1 | 1 | 2,600 | 1 |

Rating system:
0 = no cracks or abrasion.
1 = microcracks or some visual abrasion.
2 = some visual cracks plus microcracks or deep abrasion without finish or coating failure.
3 = severe visual cracks or complete failure of finish at some point.
4 = failure of the finish.

I claim:
1. A vapor-permeable coriaceous synthetic microporous sheet material comprising
   1. a porous fibrous substrate of a synthetic polymeric material reinforced with polyester fibers wherein the synthetic polymeric material is a polymer blend of a chain-extended polyurethane and up to 50 percent by weight of polyvinyl chloride and having adhered thereto a synthetic microporous polymer coating (A) of a polymer blend of a chain-extended polyurethane and up to 50 percent by weight of polyvinyl chloride, and
   2. about 0.02–5 mils of a nonporous vapor-permeable finish (B) in adherence to the microporous polymer coating consisting essentially of a blend of
      a. 35–65 percent by weight of a chain-extended polyester polyurethane of an isocyanate-terminated prepolymer of a diisocyanate selected from the group consisting of an aliphatic diisocyanate and a cycloaliphatic diisocyanate and a hydroxy-terminated polyester glycol having a molecular weight of about 800–1,800 chain-extended with an aliphatic diamine,
      b. 65–35 percent by weight of cellulose acetate butyrate having a butyryl content of about 15–50 percent by weight and a viscosity of 1–15 poises measured according to ASTM–D–1343–56–T.

2. The sheet material of claim 1 in which the nonporous vapor-permeable finish (B) contains pigment.

3. The sheet material of claim 1 in which the chain-extended polyester polyurethane consists essentially of an isocyanate-terminated prepolymer of a cycloaliphatic diisocyanate and a hydroxy-terminated polyester of a two to five carbon atom glycol and a four to 10 carbon atom saturated aliphatic dicarboxylic acid and chain-extended with a saturated aliphatic diamine having two to eight carbon atoms.

4. The sheet material of claim 3 in which the chain-extended polyester polyurethane consists essentially of an isocyanate-terminated prepolymer of methylene-bis-(4-cyclohexyl isocyanate) and a hydroxy-terminated polyester of adipic acid and ethylene glycol having a molecular weight of about 800–1,800 and chain-extended with ethylene diamine.

5. The sheet material of claim 1 in which the chain-extended polyester polyurethane consists essentially of an isocyanate-terminated prepolymer of methylene-bis-(4-cyclohexyl isocyanate) and a hydroxy-terminated polyester of a glycol having two to three carbon atoms and a saturated aliphatic dicarboxylic acid having four to 10 carbon atoms and chain-extended with an aliphatic diamine having two to eight carbon atoms and in which the cellulose acetate butyrate has a butyryl content of 35–40 percent and a viscosity of 1–2 poises.

6. The sheet material of claim 1 in which the chain-extended polyester polyurethane consists essentially of an isocyanate-terminated prepolymer of methylene-bis-(4-cyclohexyl isocyanate) and a hydroxy-terminated polyester of a glycol having two to three carbon atoms and a saturated aliphatic dicarboxylic acid having four to 10 carbon atoms and chain-extended with cyclohexane-bis-(methylamine) in which the cellulose acetate butyrate has a butyryl content of 35–40 percent and a viscosity of 1–2 poises.

7. The sheet material of claim 1 in which the chain-extended polyester polyurethane consists essentially of an isocyanate-terminated prepolymer of a cycloaliphatic diisocyanate and a hydroxy-terminated glycol having two to five carbon atoms and an aromatic dicarboxylic acid and is chain-extended with an aliphatic diamine having two to eight carbon atoms in which the cellulose acetate butyrate has a butyryl content of 35–40 percent and a viscosity of 1–2 poises.

* * * * *